United States Patent [19]

Tanno

[11] 4,087,375
[45] May 2, 1978

[54] METHOD FOR TREATING RADIOACTIVE WASTE WATER

[75] Inventor: Minoru Tanno, Shiogama, Japan

[73] Assignee: Shin Tohoku Chemical Industry Co., Ltd., Japan

[21] Appl. No.: 682,405

[22] Filed: May 3, 1976

[30] Foreign Application Priority Data

May 7, 1975 Japan .................................. 50-55180
Aug. 8, 1975 Japan .................................. 50-96433

[51] Int. Cl.² .......................... C09K 3/00; C09K 11/04
[52] U.S. Cl. ............................ 252/301.1 W; 210/38 C
[58] Field of Search ....................... 210/38 C; 423/6; 252/301.1 W

[56] References Cited

U.S. PATENT DOCUMENTS

| | | | |
|---|---|---|---|
| 2,616,847 | 11/1952 | Ginell | 252/301.1 W |
| 3,017,242 | 1/1962 | Ames | 210/38 C |
| 3,274,784 | 9/1966 | Shock et al. | 252/301.1 W |
| 3,340,200 | 9/1967 | Noble | 252/301.1 W |
| 3,380,916 | 4/1968 | Katz et al. | 210/38 C |

Primary Examiner—John Adee
Assistant Examiner—E. Rollins Cross
Attorney, Agent, or Firm—Browdy and Neimark

[57] ABSTRACT

Corrosive radionuclides, other radionuclides and fission-products contained in the primary cooling water employed in light-water type nuclear reactors and waste water discharged from the reprocessing of neutron irradiated nuclear fuels (both being referred to as radioactive waste water hereunder) can be rendered harmless to man by being adsorbed and captured by mordenite and the mordenite which has captured said nuclides is sintered to a ceramic form, thereby sealing and fixing the nuclides in said sintered mardenite.

6 Claims, 5 Drawing Figures

METHOD FOR TREATING RADIOACTIVE WASTE WATER

BACKGROUND OF THE INVENTION (1) Field of the Invention

This invention relates to a method for treating radioactive waste water, and more particularly, it relates to a method for allowing those corrosive radionuclides, other radionuclides and fission-products which are contained in the radioactive waste water to be adsorbed and captured by mordenite, thereby rendering these radioactive materials harmless to man.

(2) Description of the Prior Art

During operations of the light-water type reactor, heavy metals such as Fe, Ni, Mn, Cr, etc contained in the building materials of the reactor are attacked by corrosion and gradually dissolved in the cooling water. When the cooling water passes by the core, these metals are irradiated with neutrons and converted to corrosive radionuclides. Most of these nuclides stay in the primary cooling system and this causes such abnormalities in the reactor as local corrosion and stress corrosion. In addition, since the amount of such nuclides produced increase in proportion to the operation time of the reactor, they will have accumulated in great quantities at bends valves and pumps of the primary cycling system by the time that the operation of the reactor has been discontinued.

Another reason for the accumulation of radioactivity is the releasing of fission-products into the primary cooling system. In particular, if fuel cladding materials break due to corrosion and cracks, a large amount of the fission-products is released in the cooling water, and part of them may even leak out of the reactor.

Fission-products and corrosive radionuclides are also observed during the reprocessing of neutron irradiated nuclear fuels. No technology has to date been developed for insuring safe removal and recovery of these radioactive materials. There is therefore need that such technology be immediately developed, and this need is particularly great for the recovery of Cs-137 by reason of its high yield and long half-life (30 years). Furthermore, because Cs-137 is valuable as a source of heat, power, and gamma rays, efficient and economic recovery of this element can play a very important role in energy conservation.

In the conventional art, ion exchange resins have been employed to remove a variety of radioactive materials from the primary cooling water in the light water type reactor. Low and intermediate level radioactive nuclides produced in the course of reprocessing of neutron irradiated nuclear fuels have also been eliminated by means of using an organic ion exchange material. But such conventional method has many disadvantages in that the organic ion exchanger itself is susceptible to radiation damage and, also, a slight amount of light metals, heavy metals or fission-products cannot be captured by the exchanger. Other drawbacks are that not only is the ion exchanger poor in anti-radioactivity and heat resistance but also it eventually has to be discarded.

As explained above, there has long been a great need for improving the conventional method of separating, removing and recovering radioactive materials from radioactive waste water for ensuring easy, safe and efficient separation, removal and recovery of said radioactive materials.

The present inventors have accomplished this invention by noting the fact that zeolites, especially mordenite, have great acid resistance, heat resistance and anti-radio-activity as well as great ability to capture radioactive nuclides.

SUMMARY OF THE INVENTION

Therefore, one object of this invention is to provide a novel method for treating radioactive waste water.

Another object of this invention is to provide a method for separating, removing and recovering radioactive materials from radioactive waste water.

A further object of this invention is to provide a method for allowing a variety of radionuclides in radioactive waste water to be adsorbed and captured by mordenite.

A still further object of this invention is to provide a process for subjecting a variety of the radionuclides thus adsorbed and captured by mordenite to elution thereby concentrating the nuclides in the eluant.

Another specific object of this invention is to provide a process for adsorbing and capturing Cs-137 contained in the radioactive waste water by mordenite, followed by elution to concentrate Cs-137 in the eluant.

Still another object of this invention is to provide a method for treating radioactive waste water characterized in that the mordenite, in which the radionuclides contained in the radioactive waste water are adsorbed and capture is sintered to a ceramic form at high temperatures, thereby fixing and encasing said radionuclides in the sintered product.

Other objects and advantages of this invention will become apparent in the following pages.

DETAILED EXPLANATION OF THE INVENTION

Figure 1:
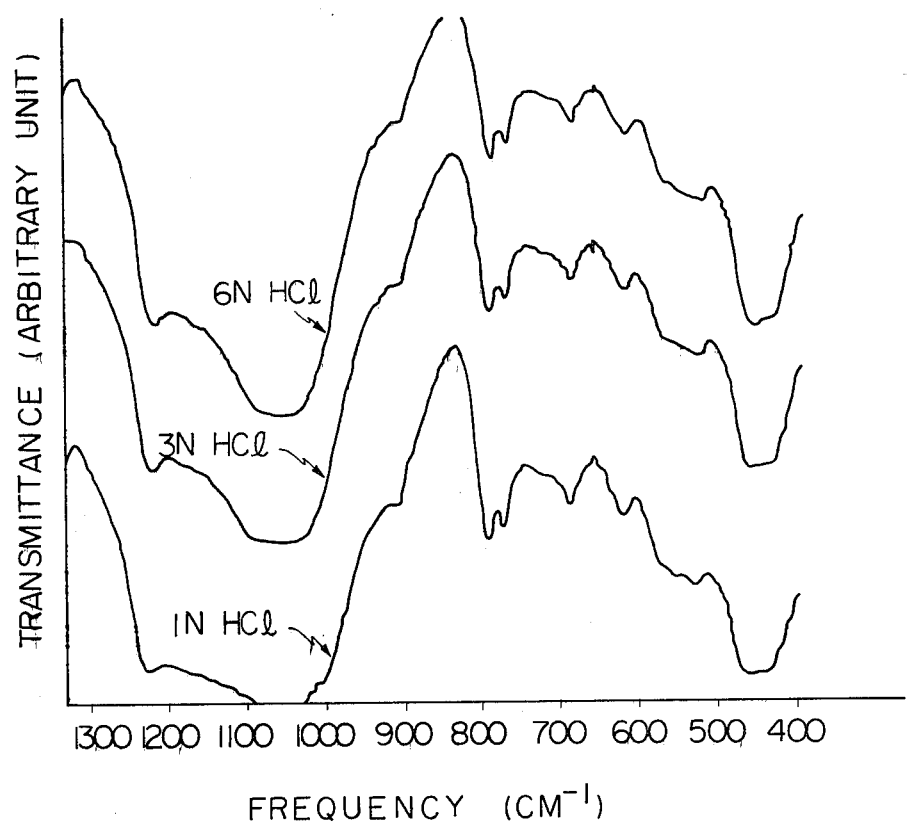
FIG. 1 shows the I.R. absorption spectrum of the mordenite to be used in this invention that is treated with 1 N, 3 N, and 6 N of HCl, respectively.
Figure 2:
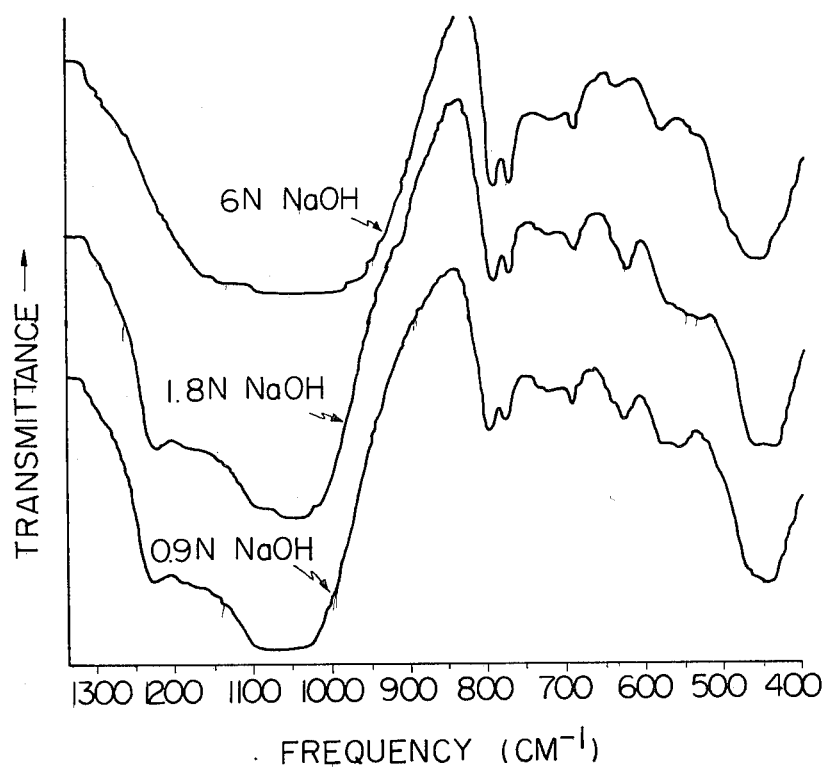
FIG. 2 shows the I.R. absorption spectrum of the mordenite to be used in this invention that is treated with 0.9N, 1.8N, and 6N of NaOH, respectively.
Figure 3:
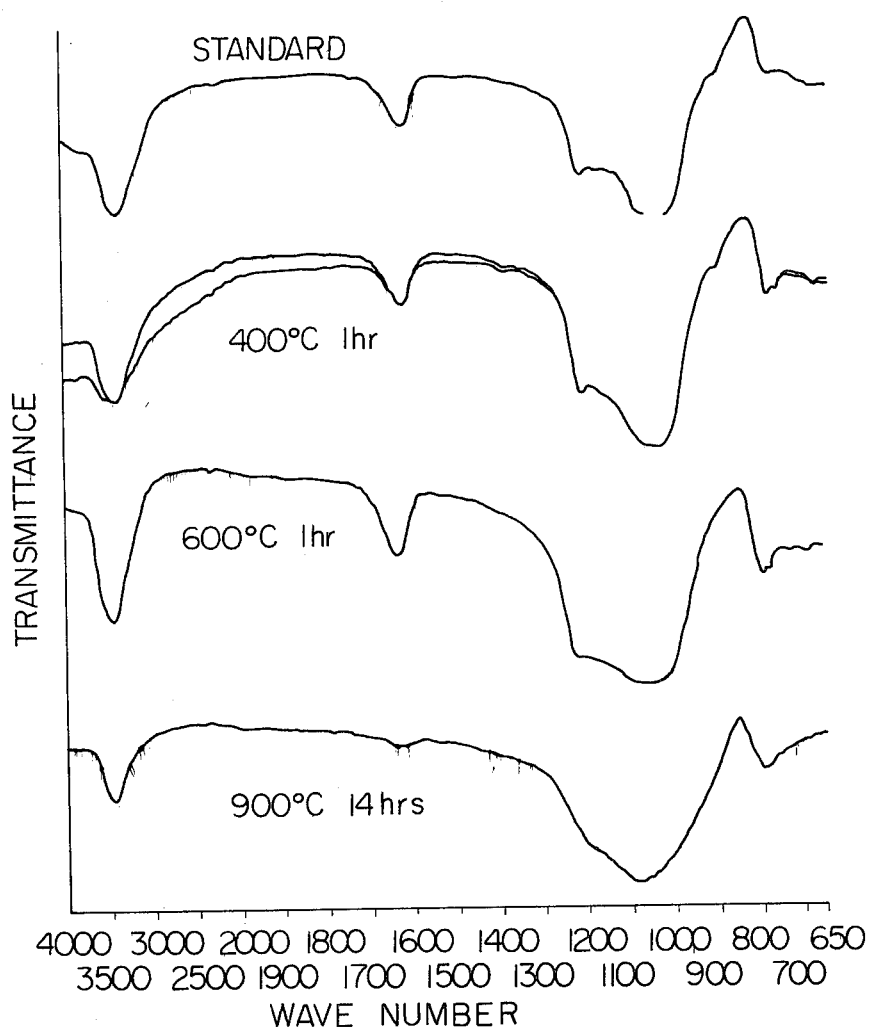
FIG. 3 shows the I.R. absorption spectrum of the mordenite to be used in this invention that is heated at 400° C for one hour, 600° C for one hour and 900° C for 14 hours, respectively.
Figure 4:
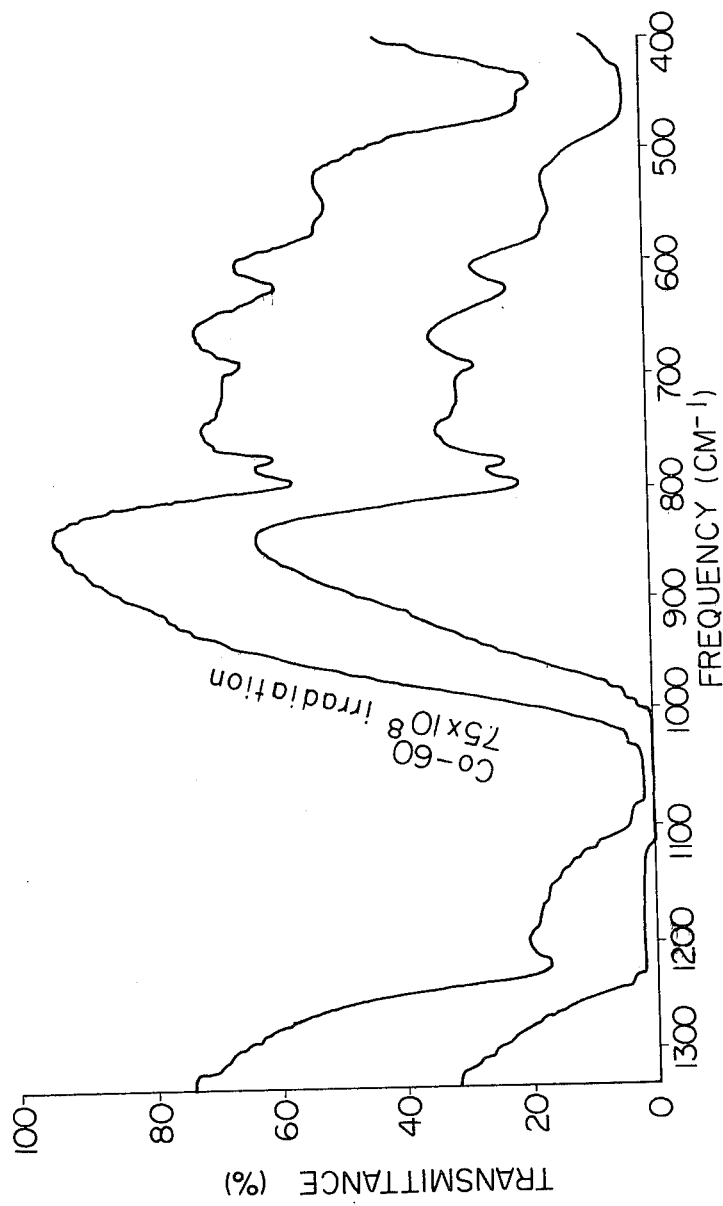
FIG. 4 shows the I.R. absorption spectrum of the mordenite to be used in this invention that is irradiated with Co-60 at a dose of $7.5 \times 10^8$.

As a result of incessant studies, the present inventors have found that zeolites, especially mordenite, are advantageously employed to achieve the principal object of this invention.

Zeolites including mordenite are alkali metal salts or alkaline earth metal salts of crystalline aluminum hydrosilicates composed of crystal lattices of three dimensional network structure having cavities or channels. They are represented by the formula $M_{2/n} \cdot Al_2O_3 \cdot X SiO_2 \cdot H_2O$ (wherein M is at least one cation, and n is its valence). The cation (M) in zeolites has ion exchange ability, and so, zeolites are conventionally employed to remove harmful cations from, for example, water. The usefulness of zeolites is not limited to ion exchange; they are able to exhibit mechanical adsorption.

The present inventors have conducted experiments on the acid resistance, alkali resistance, heat resistance and antiradioactivity of mordenite that is suitable for use in this invention. The results are shown in FIGS. 1 to 4, which clearly demonstrate the following:

Acid resistance: The crystal structure was treated with 5N of HCl, but it was serviceable even in the presence of 12N of HCl.

Alkali resistance: The crystal structure was stable until the mordenite was treated with 1N -6N of NaOH.

Heat resistance: The crystal structure was stable up to 600° C, and the mordenite was serviceable up to 900° C.

Anti-radioactivity: The crystal structure was stable against irradiation with Co-60 at a dose of $10^8$ to $10^9$ Rad.

Accordingly, the mordenite to be used in this invention can advantageously be employed to adsorb and capture radioactive light metals, heavy metals and other radioactive substances that are contained in a variety of radioactive waste water. Worthy of special mention is the fact that the mordenite according to this invention exhibits highly selective adsorption with respect to Cs-137 which has been difficult to deal with by the conventional method for treating radioactive wastes. In particular, mordenite having monovalent ions can easily adsorb and capture a slight amount of Cs-137 if it is present in the form of a solution diluted to $10^{-4}$ to $10^{-6}$ mol/l. Should the radioactivity of waste water containing Cs-137 be $\mu\mu$Ci/ml, the radioactive element can easily be captured by the mordenite and the liquid waste is rendered harmless to man.

According to the process of this invention, the reactor cooling water containing corrosive radionuclides of heavy metals such as Fe, Co, Mn, Cr and Ni, and liquid waste water discharged from the fuel reprocessing operations containing low-, intermediate and high-level fission-products such as Cs (137), Sr (89–90), Kr (85), Xe (132), Y (90), Ce (141–144), Pm (147), Zr (95), I (131), Ru (103–106), Ba and Am, are passed through a mordenite column at a velocity of 3–50 cm/min for the former case and 2–40 cm/min for the latter, thereby allowing the corrosive radionuclides and fission-products to be adsorbed and captured by said mordenite, followed by, if necessary, elution of the thus adsorbed and captured radioactive substances by means of an eluant such as alkali metal salts or polyvalent metal salts like NaCl, KCl and NH₄Cl, thus obtaining the radioactive substances concentrated in the eluant. In addition to these chlorides, solutions of salts such as soluble sulfates and nitrates can be used as the eluant.

Particularly advantageous eluants are, for example, solutions of chlorides of sodium, potassium and ammonium salts. Such solutions of salts are employed after they have been stabilized to be acid, neutral or alkaline. But solutions of bivalent to polyvalent metal salts should not be used under alkaline conditions because they form insoluble precipitates.

Further in accordance with this invention, Cs-137 can be selectively and efficiently recovered from acidic to alkalinic (preferably within the range of pH 2–11) radioactive waste water containing a variety of ions by use of mordenite having ion exchange groups mainly consisting of monovalent metal ions through the steps of ion exchange adsorption, separation and concentration without damage to the structure of the mordenite.

Cs-137 and other nuclides concentrated in the eluant in the manner described above may again be adsorbed on the mordenite to saturation. Alternatively, the mordenite which has captured the Cs-137 and other nuclides may be sintered to a ceramic form at 1000°–1400° C to destroy its three dimensional structure, thereby closing an infinite number of micro or macro pores present in the mordenite to seal and fix the Cs-137 and other nuclides. Since the zeolite that has adsorbed a great amount of Cs-137 is solidified to a ceramic body as mentioned above, there is no possibility of leakage of the radioactive element. Such ceramic body can be utilized efficiently and safely as a source of heat, power and radiation. Other nuclides can also be recycled to useful applications by similar treatments. Therefore, the process of this invention is more efficient and economical than the conventional radioactive waste disposal methods, such as encasement in concrete which permits considerable leakage of radioactivity, and encasement in glass that requires a troublesome melting pot. Another great advantage of this invention is that it allows for the treatment of Cs-137 and other nuclides in such a manner that they can be recycled to useful applications.

This invention will hereunder be explained more specifically by working examples, but it will be understood by those skilled in the art that this invention is by no means limited by these examples.

EXAMPLE 1

A sample of the cooling water was passed through a mordenite column (the thickness of the zeolite bed being 1,200 mm, and the diameter being 130 mm) in the direction of gravity at a velocity of 8.3 cm/min., thereby having a variety of ions contained in the cooling water adsorbed and captured by the mordenite bed. Subsequently, the ions thus adsorbed were eluted with 5N of NaCl which moved countercurrently, and concentrated in the eluant. This procedure was repeated three times. The results are indicated below.

| Ions | Ion Concentrations in Cooling Water (ppm) | Ions Concentrated in Eluant (ppm) |
|---|---|---|
| NH₄-N | 10–13 | 792 |
| Total-Ca Mg | 100–160 | 7,080 |
| Cd | trace | 0.45 |
| Ni | 0.13 | 3.98 |
| Pb | 0.15 | 4.50 |
| Cu | trace | 0.50 |
| Zn | 0.055 | 4.50 |
| Hg | trace | trace |
| Co | 0.09 | 2.87 |
| Fe | 0.2 | 4.92 |
| Mn | 0.17 | 4.20 |

This table clearly shows that such minor components in the cooling water as metals, alkali earth metals and NH₄-N are captured by the mordenite of this invention. It also shows that these components, after being captured by the mordenite, were recovered as concentrates in the eluant.

EXAMPLE 2

A sample of waste water containing Cs-137 as a tracer was prepared in which the total concentrations of Cs⁺ were 114.2 ppm. The sample was passed through an adsorption column containing 5.0 g (about 9.1 ml in volume) or mordenite at a velocity of SV=36. LV=1.4 m/hr. It was found that even after treatment of 361 (corresponding to a bed volume of 960) of the sample, Cs-137 was completely captured by the mordenite phase without leakage.

EXAMPLE 3

Figure 5:
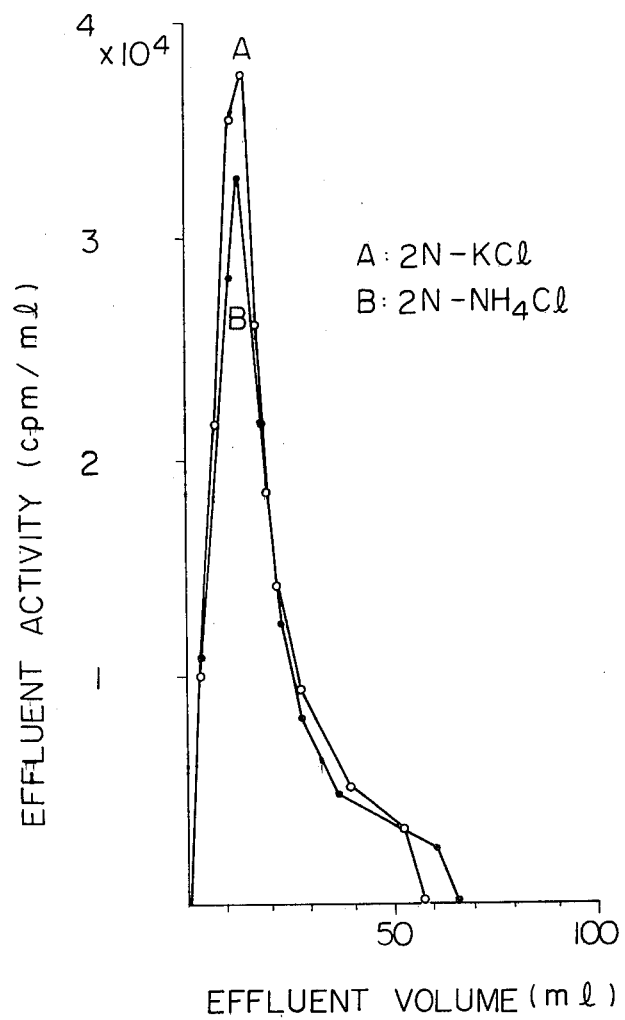
FIG. 5 shows the efficiency of recovering Cs-137 from the mordenite by means of elution.

For 5.0 g (9.1 ml) of the mordenite, 40 ml each of 2N of KCl and 2N of NH$_4$Cl was passed through the adsorption column as an eluant at a velocity of SV=5.0, LV=0.34 m/hr to recover cesium-137 that had been adsorbed and captured by the mordenite according to the manner described in Example 2. The results are indicated in FIG. 5, which clearly demonstrates the efficiency of elution in recovery of Cs-137.

EXAMPLE 4

After having adsorbed Cs-137 to saturation, the mordenite was sintered to a ceramic form. The leakage of Cs-137 from the ceramic body in distilled water and sea water was determined to obtain the following data:

In distilled water: $1.2 \times 10^{-10}$ (g/cm$^2$ per day)

In sea water: $1.0 \times 10^{-9}$ (g/cm$^2$ per day)

It was therefore confirmed that Cs-137 was completely sealed in the sintered product. In this connection, availability of the sintered ceramic body as a source of gamma rays was fully demonstrated because the radioactivity per kg of the mordenite was determined to be 23.12 Ci.

I claim:

1. A process for treating radioactive waste water comprising passing said radioactive waste water through a mordenite column at a velocity of 2–50 cm/min. to adsorb and capture a variety of radionuclides contained therein on said mordenite.

2. A process for treating radioactive waste water comprising passing said radioactive waste water through a mordenite column at a velocity of 3–50 cm/min. to adsorb and capture a variety of radionuclides contained in said waste water, passing through said column an eluant selected from the group consisting of chlorides of alkali metals, sulfates, nitrates, ammonium salts, salts of the element of the copper group and polyvalent metal salts to desorb the radionuclides from the mordenite phase thereby concentrating the same in the eluant.

3. A process for treating radioactive waste water comprising passing said radioactive waste water through a mordenite column to adsorb and capture a variety of radionuclides contained in said waste water, followed by sintering said mordenite to a ceramic form at 1000°–1400° C so that said variety of radionuclides are sealed and fixed in said sintered product.

4. A process for treating the primary cooling water employed in the light-water type reactor comprising passing said primary cooling water through a mordenite column at a velocity of 3–50 cm/min to adsorb and capture corrosive 5. A process for removing cesium-137 from the cooling water of a nuclear reactor and the drainage from a nuclear reactor, comprising passing said cooling water or drainage through a mordenite column at a velocity of 2–40 cm/min to absorb and capture said Cs-137 by said mordenite.

6. A process according to claim 5, further including the step of recovering said Cs-137 by means of elution with an eluant.

* * * * *